United States Patent [19]

Ohtake et al.

[11] Patent Number: 5,035,096
[45] Date of Patent: Jul. 30, 1991

[54] SYNTHETIC RESIN WINDOW FOR AUTOMOTIVE VEHICLES OR THE LIKE

[75] Inventors: Shinichi Ohtake; Tatsuya Tamura, both of Yokohama, Japan

[73] Assignee: Hashimoto Forming Industry Co., Ltd., Japan

[21] Appl. No.: 572,235

[22] Filed: Aug. 24, 1990

[51] Int. Cl.$^5$ .............................................. E06B 3/00
[52] U.S. Cl. .................................. 52/208; 52/400; 296/93
[58] Field of Search ............... 52/208, 400; 296/93

[56] References Cited

U.S. PATENT DOCUMENTS

| | | | |
|---|---|---|---|
| 3,363,390 | 1/1968 | Crane et al. ........................ | 52/823 X |
| 3,375,626 | 4/1968 | Grotefeld et al .................... | 52/400 |
| 3,770,545 | 11/1973 | Jackson ................................. | 52/312 |
| 3,851,432 | 12/1974 | Griffin .................................. | 52/400 |
| 4,274,237 | 6/1981 | Hagstrom ............................. | 52/312 |
| 4,477,507 | 10/1984 | Kunert ................................. | 52/400 X |
| 4,505,511 | 3/1985 | Hänle et al. ........................ | 52/208 X |
| 4,621,469 | 11/1986 | Krüschwitz ........................... | 52/208 |
| 4,668,556 | 5/1987 | Hermann et al. .................... | 52/716 X |
| 4,685,718 | 8/1987 | Steenblik et al. .................... | 296/93 |
| 4,707,958 | 11/1987 | Armbruster ........................... | 52/208 |
| 4,707,958 | 11/1987 | Armbruster ........................... | 156/108 |
| 4,712,826 | 12/1987 | Omori ................................... | 296/93 |
| 4,731,973 | 3/1988 | Stenemann ........................... | 52/400 X |
| 4,894,972 | 1/1990 | Endoh et al. ........................ | 52/208 X |

FOREIGN PATENT DOCUMENTS

| | | |
|---|---|---|
| 1958772 | 6/1971 | Fed. Rep. of Germany ........ 52/400 |
| 2165196 | 7/1973 | Fed. Rep. of Germany .......... 101/ |
| 3536806 | 4/1987 | Fed. Rep. of Germany .......... 400/ |
| 2825926 | 1/1980 | Fed. Rep. of Germany .......... 716/ |
| 1374552 | 9/1963 | France . |
| 0170622 | 10/1983 | Japan ....................................... 93/ |
| 59-171733 | 9/1984 | Japan . |
| 61-32808 | 2/1986 | Japan . |
| 62-251229 | 11/1987 | Japan . |
| 62-257831 | 11/1987 | Japan . |
| 63-112143 | 5/1988 | Japan . |
| 2147244 | 9/1983 | United Kingdom . |

Primary Examiner—Richard E. Chilcot, Jr.
Assistant Examiner—Kien T. Nguyen
Attorney, Agent, or Firm—Stevens, Davis, Miller & Mosher

[57] ABSTRACT

A synthetic resin window, e.g. for automotive vehicles, includes a window body portion in the form of a sheet of transparent or semi-transparent synthetic resin, and a frame portion formed of the same resin as the body portion and molded integrally therewith to extend along peripheral edge of the body portion. The outer surfaces of the body portion and the frame portion are covered by a hard coated layer and an opaque coated layer, respectively. The frame portion has a profile greater in thickness than the window body portion, while a hollow inner space is formed in the frame portion to extend continuously in the longitudinal direction of the frame portion.

3 Claims, 3 Drawing Sheets

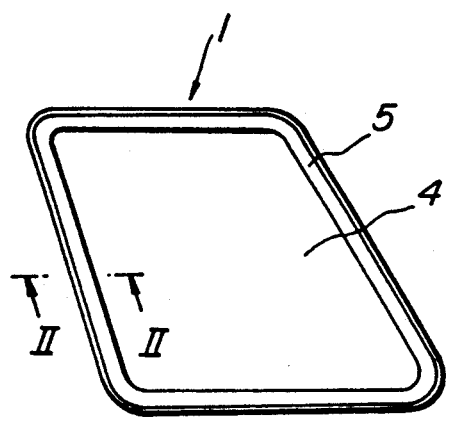
FIG_1
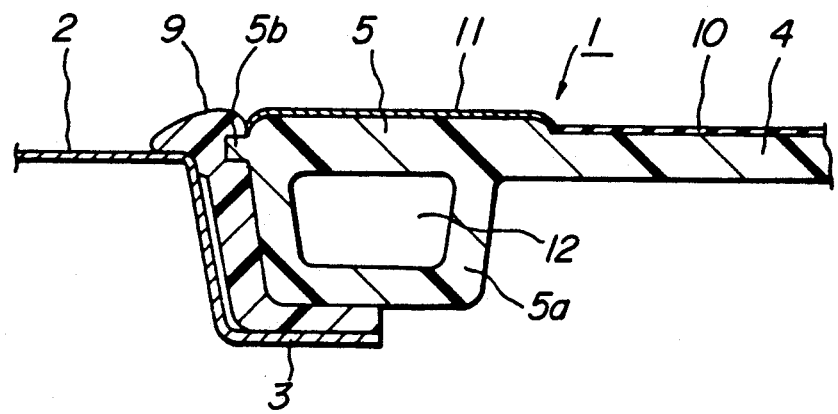
FIG_2

FIG_3
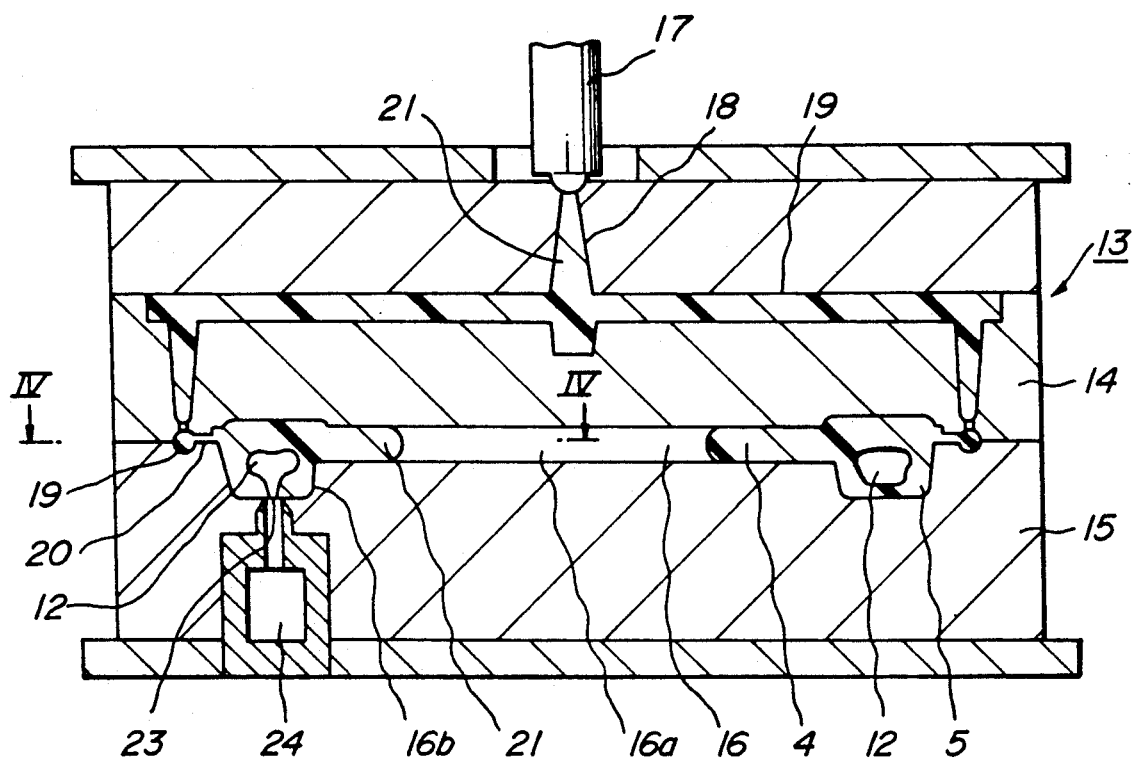
FIG_4
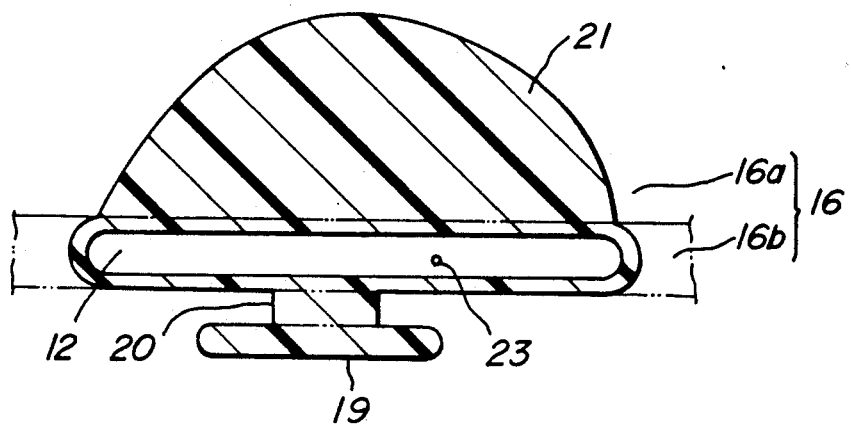

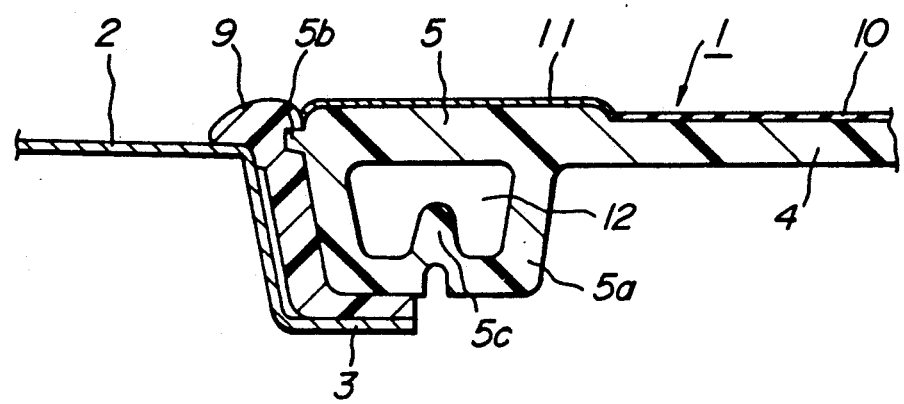
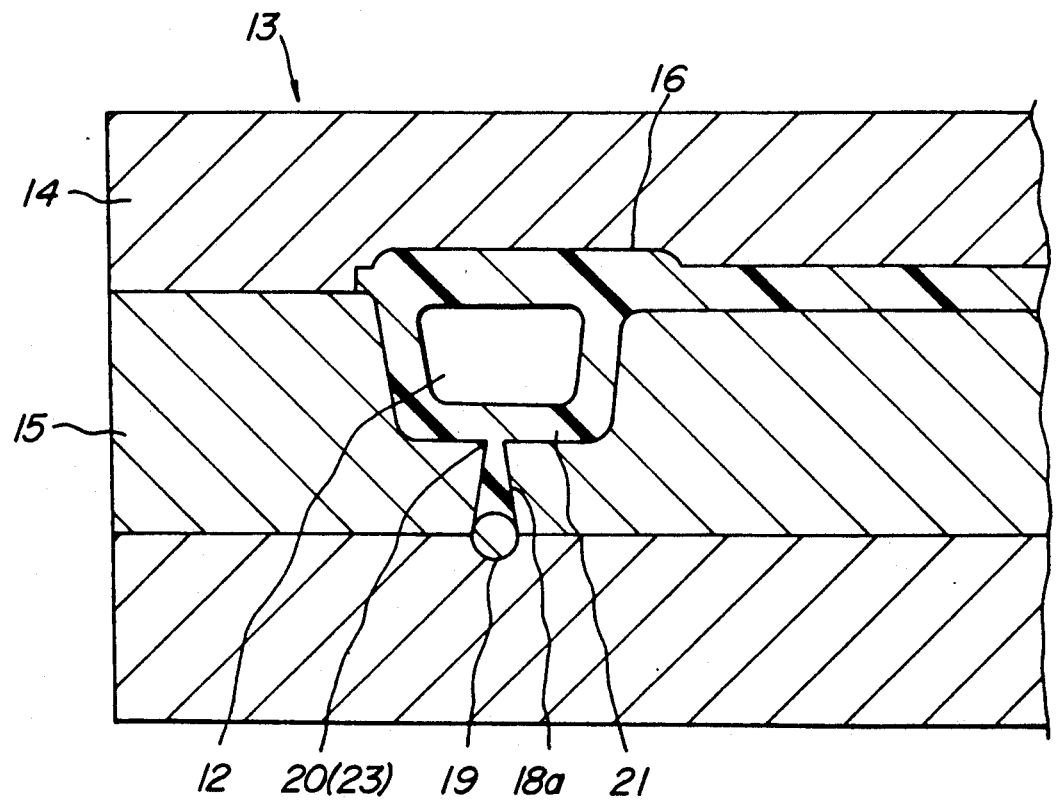

SYNTHETIC RESIN WINDOW FOR AUTOMOTIVE VEHICLES OR THE LIKE

BACKGROUND OF THE INVENTION

1. Field of the Invention

The present invention relates to a window made of synthetic resin, and more particularly to a synthetic resin window which is suitable for automative vehicles or the like.

2. Description of the Related Art

A synthetic resin window for automative vehicles is disclosed, e.g., in Japanese Utility Model Application Laid-open Publication No. 61-32,808, as being manufactured by injection molding process. The known synthetic resin window generally includes a window body portion of transparent or semi-transparent synthetic resin, such as polycarbonate or acrylic resin, as well as a frame portion extending along the peripheral edge of the body portion and formed into a predetermined shape which corresponds to flange of a relevant vehicle body panel.

Due to susceptibility of the synthetic resin to scratches or the like damages, the outer surface of the window body portion is generally covered by a hard coated film layer, while the outer surface of the frame portion is covered by an opaque coated layer of a desired color.

For mounting the synthetic resin window onto the flange portion of the vehicle body panel, the frame portion is integrally formed on its inner surface side with bosses to accommodate therein threaded mount members which are to be inserted into corresponding openings in the flange portion and engaged by respective nuts. A satisfactory tight contact between the window and the vehicle body panel can be achieved by a cushioning member of soft or resilient material arranged on regions of the frame portion to be brought into abutment with the vehicle body panel.

The abovementioned known synthetic resin window proved to be advantageous particularly in its reduced weight, but suffers from a problem of significantly low rigidity as compared with conventional inorganic glass windows. Thus, the synthetic resin window as mounted on the vehicle body panel often exhibits undesirable deformation or damage as a result of fastening force or the like.

The required rididity of the synthetic resin window might be realized either by increasing the thickness of the window body portion itself, or by providing reinforcing ribs on the frame portion. However, these solutions are not very suitable from practical viewpoints that an increased thickness of the window body portion would make it almost impossible to achieve a reduced weight of the window as a whole, while provision of the reinforcing ribs on the frame portion more or less results in formation of undesirable sink mark on the outer surface of the frame portion to significantly deteriorate the appearance.

SUMMARY OF THE INVENTION

Therefore, it is an object of the present invention to eliminate the drawbacks of conventional arrangement, and to provide an improved synthetic resin window which is light in weight and rigid enough to prevent any deformation or damages of the window as mounted in place, even when the window body portion has a thickness substantially same as that of the inorganic glass window, and which is free from any sink mark even when reinforcing ribs are formed along the frame portion, thereby realizing a refined appearance.

According to the present invention, there is provided a synthetic resin window for automotive vehicles or the like, comprising: a window body portion in the form of a sheet of transparent or semi-transparent synthetic resin; a frame portion formed of the same resin as said body portion and molded integrally therewith to extend along peripheral edge of said body portion; a hard coated layer covering an outer surface of said body portion; and an opaque coated layer covering an outer surface of said frame portion; wherein said frame portion has a profile which is greater in thickness than the window body portion, while a hollow inner space is formed in said frame portion to extend continuously in the longitudinal direction of said frame portion.

In the synthetic resin window according to the present invention, the frame portion with a profile greater in thickness than the window body portion makes it readily possible to improve the rigidity of the window and prevent deformation or damages thereof when the window is mounted in place. Moreover, the hollow inner space formed within the frame portion serves to reduce the effective thickness of the synthetic resin forming the frame portion so that, despite a relatively thick profile of the frame portion, it is possible to prevent formation of sink marks or the like on the outer surface, while at the same time reducing the consumption of synthetic resin and the overall weight of the window.

BRIEF DESCRIPTION OF THE DRAWINGS

FIG. 1 is a perspective view of a side window for an automotive vehicle according to one preferred embodiment of the invention;

FIG. 2 is a cross-sectional view taken along the line II—II of FIG. 1;

FIG. 3 is a cross-sectional view of one example of injection molding apparatus which can be used to manufacture the window according to the present invention;

FIG. 4 is a cross-sectional view of the apparatus taken along the line IV-IV of FIG. 3;

FIG. 5 is a cross-sectional view similar to FIG. 2, showing a side window according to another embodiment of the present invention; and FIG. 6 is a cross-sectional view of another example of injection molding apparatus which can be used to manufacture the window according to the present invention.

DETAILED DESCRIPTION OF THE PREFERRED EMBODIMENTS

The present invention will be explained below with reference to some preferred embodiments shown in the drawings.

Referring now to FIGS. 1 and 2, there is shown a synthetic resin side window according to one embodiment of the present invention, which is for an automotive vehicle. The window is designated by reference numeral 1, and is made as a whole of appropriate synthetic resin by means of an injection molding process, as will be described hereinafter, and secured to a relevant vehicle body panel 2 with a mounting flange 3.

The window 1 includes a window body portion 4 in the form of a sheet of transparent or semi-transparent synthetic resin, such as polycarbonate resin, acrylic resin, or the like. The window 1 further includes a frame portion 5 extending along the peripheral edge of the window body portion 4. The frame portion 5 is molded integrally with the window body portion 4, and composed of the same resin as the latter. A hard coated film layer 10 covers the outer surface of the window body portion 4, while an opaque coated layer 11 of a desired color covers the outer surface of the frame portion 5.

The frame portion 5 has a profile which is greater in thickness than the window body portion 4. A hollow inner space 12 is formed in the frame portion 5 and extends continuously in the longitudinal direction thereof. The inner space 12 is defined by surrounding resin wall 5a which is of approximately the same thickness as the window body portion 4.

The hard coated film layer 10 may be an organosiloxane-based surface treated layer having a sufficient hardness which is capable of preventing damages of the window 1 or formation of scratches or the like, even when the window 1 is scratched by washing brushes or the like. While the hard coated film layer 10 is formed over the entire outer surface of the window body portion 4, it may be additionally formed on the rear surface of the window body portion 4. The opaque coated layer 11 is formed of a colored opaque coating film or the like, and serves to visible conceal the inner space 12 of the frame portion 5 from outer surface side.

A ridge 5b may be formed along the outer periphery of the frame portion 5 for engaging with a cushioning member 9 of soft and/or resilient material, to be arranged between the window 1 and the vehicle body panel 2 and often called "end rubber".

There is shown in FIGS. 3 and 4 an injection molding apparatus 13 which may be used to manufacture the window 1 according to the present invention. The apparatus 13 includes upper and lower mold halves 14, 15 for defining a mold cavity 16 therebetween, as well as an injection nozzle 17, a sprue 18, runners 19 and gates 20 for injecting a resin 21 into the cavity 16. The cavity 16 is formed of a main cavity portion 16a for molding the window body portion 4, and a peripheral cavity portion 16b for molding the window frame portion 5. In order to form the hollow inner space 12 in the window frame portion 5, a gas injection port 23 is provided in the neighborhood of the gate 20 for the peripheral cavity portion 16b, and is connected to an appropriate gas injection device 24.

For manufacturing the window 1, the resin 21 in its molten state is injected into the cavity 16 out of the injection nozzle 17 through the sprue 18, runners 19 and gates 20. After the resin 21 has entered into the cavity 16, a high pressure gas, such as nitrogen gas or the like, is injected into the resin 21 from the gas injection device 24 through the port 23.

The peripheral cavity portion 16b forms a passage with a relatively large cross-section and hence, with a relatively small flow resistance. Thus, as the resin 21 flows through the cavity 16, the high pressure gas flows solely along the peripheral cavity portion 16b corresponding to the window frame portion 5. The resin within the peripheral cavity portion 16b is urged by the gas pressure against the inner surface of the peripheral cavity portion 16b and subjected to cooling and solidification with the resultant formation of a window frame portion 5 having the hollow inner space 12 therein.

On the other hand, the main cavity portion 16a forms a passage with a relatively small cross-section and hence, with a relatively large flow resistance. Thus, the high pressure gas does not flow through the main cavity portion 16a, and only the resin 21 is permitted to flow into the main cavity portion 16a, and subjected there to cooling and solidification with the resultant formation of a uniform sheet-shaped window body portion 4.

After opening the mold halves 14, 15, a hard film coating treatment or the like is carried out to form the hard coated film layer 10, while an opaque coated layer 11 is formed by application of appropriate paint to the surface of the frame portion 5, to finish the window 1. Alternatively, the hard coated film layer 10 may be formed by inserting into the mold cavity 16 a resin film having the hard coated layer to carry out a so-called insert injection molding process.

The window manufactured as above is attached to the flange 3 of the vehicle body panel 2 via the cushioning member 9, with an adhesive agent or the like.

When mounted in place, the window 1 including the frame portion 5 of a large profile along its peripheral edge provides a sufficient rigidity to eliminate undesirable deformation or damages. In addition, despite a large profile of the frame portion 5, formation of the hollow inner space 12 in the frame portion 5 makes it possible to reduce the weight and material consumption. Besides, the thickness of the resin wall 5a forming the outer surface of the frame portion 5 can be made substantially the same as that of the window body portion 4, and it is thus possible to prevent formation of sink marks or the like on the outer surface of the frame portion 5, and realize a refined appearance of the product.

Another embodiment of the window according to the present invention is shown in FIG. 5, wherein a rib 5c is formed on the inner surface of the resin wall 5a defining the hollow inner space 12 and forming the rear side of the frame member 5, to further increase the rigidity of the frame portion 5. Formation of the rib 5c on the resin wall 5a on the rear side of the frame member 5 serves to more positively prevent undesirable deformation of the outer surface of the frame portion 5.

Another example of the injection molding apparatus for manufacturing the window according to the present invention is shown in FIG. 6, wherein the gate 20 for injecting into the cavity 16 the resin 21 from the injection nozzle through the sprue, runner 19 and a second sprue 18a is used also as a gas injection port 23 for injecting the high pressure gas into the resin 21. Such an arrangement of the apparatus is suitable particularly when the gate 20 is arranged only at a single location, or a molded article is relatively small in size.

It will be readily appreciated from the foregoing description that the present invention provides an improved synthetic resin window which is light in weight and rigid enough to prevent any deformation or damages or the window as mounted in place, even when the window body portion has a thickness substantially same as that of the inorganic glass window. Moreover, the window according to the present invention is free from any sink mark even when reinforcing ribs are formed along the frame portion, and makes it possible to realize a refined appearance.

While reference was made to side windows in the embodiments described above, the present invention may also be applied to other windows, such as sun roof window. Also, a number of variation and/or modifications may be made without departing from the scope of the invention, for example in shape of the window body portion and the frame portion.

What is claimed is:

1. A synthetic resin window for automotive vehicles or the like, comprising: a window body portion in the form of a sheet of transparent or semi-transparent synthetic resin; a frame portion formed of the same resin as said body portion and molded integrally therewith to extend along peripheral edge of said body portion; a hard coated layer covering an outer surface of said body portion; and an opaque coated layer covering an outer surface of said frame portion, wherein said frame portion has a profile which is greater in thickness than the window body portion, while a hollow inner space is formed in said frame portion to extend continuously in the longitudinal direction of said frame portion.

2. The window as set forth in claim 1, wherein said hollow inner space is defined by a resin wall of substantially the same thickness as the window body portion.

3. The window as set forth in claim 2, wherein a reinforcing rib is formed on inner surface of said resin wall on rear side of said frame member.

* * * * *